United States Patent
Dean-Reese et al.

(10) Patent No.: US 11,198,209 B1
(45) Date of Patent: Dec. 14, 2021

(54) POCKET INSERT REMOVAL TOOL AND METHOD

(71) Applicant: Lydia Dean-Reese, Burtonsville, MD (US)

(72) Inventors: Lydia Dean-Reese, Burtonsville, MD (US); Oliver Lee Edwards, Silver Spring, MD (US)

(73) Assignee: Lydia Dean-Reese, Burtonsville, MD (US)

( * ) Notice: Subject to any disclaimer, the term of this patent is extended or adjusted under 35 U.S.C. 154(b) by 0 days.

(21) Appl. No.: 16/812,364

(22) Filed: Mar. 8, 2020

Related U.S. Application Data

(60) Provisional application No. 62/815,752, filed on Mar. 8, 2019.

(51) Int. Cl.
| | |
|---|---|
| *B42F 13/00* | (2006.01) |
| *B25J 15/00* | (2006.01) |
| *A47L 25/00* | (2006.01) |
| *B25B 9/02* | (2006.01) |

(52) U.S. Cl.
CPC .............. *B25B 9/02* (2013.01); *A47L 25/005* (2013.01); *B25J 15/008* (2013.01); *B42F 13/006* (2013.01); *B42F 13/0053* (2013.01); *B42P 2221/10* (2013.01)

(58) Field of Classification Search
CPC ..... B42F 13/006; A47L 25/005; B25J 15/008; B42P 2221/10
USPC ................ 402/3; 40/661.9, 661.11; 294/212; 29/270, 278
See application file for complete search history.

(56) References Cited

U.S. PATENT DOCUMENTS

| | | | | |
|---|---|---|---|---|
| 3,373,457 A | * | 3/1968 | Rough, Jr. ............ | A47L 25/005 15/104.002 |
| 4,681,472 A | * | 7/1987 | Ruble ................... | B42F 13/006 226/6 |
| 4,998,840 A | * | 3/1991 | Ruble ..................... | B42F 21/00 281/15.1 |
| 5,533,288 A | * | 7/1996 | Lambert .................. | A47G 1/06 40/754 |
| 5,765,887 A | * | 6/1998 | Weichman .............. | B25B 33/00 294/219 |
| 6,267,412 B1 | * | 7/2001 | Henderson ............. | B42D 25/00 281/15.1 |
| 6,695,518 B2 | * | 2/2004 | Ruble ................... | B42F 13/006 281/21.1 |
| 7,247,214 B2 | * | 7/2007 | Chamandy ........... | G06K 19/027 156/249 |

(Continued)

FOREIGN PATENT DOCUMENTS

DE          1953633 A1 *  5/1971  ............. E04C 2/041

*Primary Examiner* — Kyle R Grabowski
(74) *Attorney, Agent, or Firm* — Law Office of Oliver Edwards LLC; Oliver Edwards

(57) ABSTRACT

An inventive tool enables easy removal of label media from tight spaces, such as removal of a spine or cover label from the label pocket of a notebook binder. The tool is generally flat, skinny, and long and has an adhesive capture end and a handle end. The adhesive capture end utilizes a low- to medium-tack pressure sensitive adhesive to capture the entrapped label media when the tool is inserted into the pocket. Modes of providing a pressure sensitive adhesive end include spray application and double- and single-coated films and other media.

12 Claims, 4 Drawing Sheets

(56) References Cited

U.S. PATENT DOCUMENTS

| | | | |
|---|---|---|---|
| 2002/0110405 A1* | 8/2002 | Marshall | B42F 13/006 402/73 |
| 2009/0255073 A1* | 10/2009 | Emmons | A47L 25/005 15/104.002 |
| 2013/0031761 A1* | 2/2013 | Seyoum | B25B 33/00 29/426.1 |
| 2013/0170938 A1* | 7/2013 | Lowden | A45C 11/182 414/800 |

* cited by examiner

POCKET INSERT REMOVAL TOOL AND METHOD

BACKGROUND

Technical Field

The present technical solution relates to a tool and method for removing an insert from a pocket, for example, removing a cover or spine label from a loose-leaf binder pocket. Many binders feature clear pockets on their cover and spine for the insertion of labels and cover media, allowing binders to be easily customized for a particular purpose. For example, a binder might have custom printed cover and spine labels inserted in the pockets identifying the contents as the "2019 membership directory." In 2020, the binder cover and spine can be updated by removing the old 2019 cover and spine labels with the inventive tool and method and inserting the new 2020 cover and spine labels.

Background Art

U.S. patent application publication US 2013/0031761 by Seyoum discloses a tool for removing a binder spine label insert. The tool is substantially an elongated flat bar with one end adapted as a hand grip and the other end having a barb protruding out of the flat plane of the bar and angled back towards the grip. A spine label is removed from the binder spine pocket by inserting the tool into the pocket so that the barb can puncture the label media (typically heavy paper) and then pulling the tool back out with the media still engaged with the barb. A disadvantage of Seyoum is that the label is necessarily damaged by the tool and that there is a high risk of damaging the binder. There is also a risk of user injury from the barb.

U.S. Pat. No. 4,681,472 to Ruble is also directed to the problems involved with binder label insert media. Ruble teaches that the binder is specially fabricated to include a spine pocket with a wide open top end and a bottom end with a narrow opening. A leader is disposed through the narrow opening, through the pocket, and out the top. The top end of the leader has an adhesive portion to which a label medium is adhered. Then the leader is pulled from the bottom so that the label is drawn into the pocket. Ruble teaches that the leader is stored around the pocket when not being used functionally; it is therefore necessarily non-rigid and at a functional disadvantage for later insertion. Ruble's invention is further disadvantageous because it requires each binder to be properly manufactured with the leader; also, the leader is stored in plain view around the pocket and has the risk of being damaged by mere ordinary usage of the binder.

SUMMARY OF INVENTION

The present technical solution overcomes disadvantages of the prior art.

In one embodiment there is a task tool for aiding removal of a cover or spine label from a binder or book pocket. The task tool has an elongated flat element having first and second surfaces, an insertion end and a handle end, and a thickness and a width dimensioned such that the flat element can be inserted into a spine label pocket. The tool also has a tacky material on a portion of the first surface of the element near the insertion end, the tacky material having sufficient tackiness to adhere to a label being removed from a binder or book pocket. The task tool has a handle portion extending from the handle end of the elongated flat element.

In some embodiments, the tacky material has a light- to medium-tack pressure sensitive adhesive. In some embodiments, the tacky material comprises a differential double-coated tape having a higher-tack side for adhering to the element and a light- to medium-tack side to adhere to the label being removed (the higher-tack side may have a tackiness of 120 to 250 gm/cm and the lower-tack side may have a tackiness of 30-120 gm/cm). In some embodiments, the portion of the first surface of the element is recessed by reducing the thickness of the portion of the element. In some embodiments, the insertion end is tapered in the width dimension. In some embodiments, the insertion end comprises an insertion-easing edge profile. In some embodiments, the insertion end comprises an insertion end ramp oriented to lessen butting of the tacky material when the flat element is inserted into a spine label pocket. In some embodiments, the insertion end comprises an aperture and the tacky material comprises a film or paper carrier having a low- to medium-tack pressure sensitive adhesive on one surface, said tacky material tacked over the first surface and aperture whereby pressure sensitive adhesive is exposed through the aperture. In some embodiments, the pressure sensitive adhesive covers all of the one surface except for a small section enabling a user to peel the substrate from the tool or from the tack supply.

Embodiments of the invention also include methods for removing a binder label insert from a binder pocket having steps of inserting the insertion end of a task tool into a binder pocket so that its tacky material contacts the binder label; applying local pressure to the binder pocket where the tacky surface portion underlies; and withdrawing the tool with the binder label adhered thereto.

In some embodiments, a task tool may have a width of 2 to 3 cm and the thickness is 0.5 to 1.5 mm. In some embodiments, the task tool may comprise a high stiffness paperboard. In some embodiments, the task tool may comprise a substantially rigid and resilient plastic. In some embodiments, the task tool may comprise stainless steel having a thickness of 0.5 to 0.9 mm.

In other embodiments of the invention, a kit for removing binder labels is provided, having a task tool where the tacky material is removeable and replaceable, and a supply of tacky material sized to overcover the aperture of the task tool.

In other embodiments of the invention, a kit for removing binder labels has multiple task tools and each task tool has a width different than at least one other task tool and each task tool has an aperture size. The tacky material of each task tool is removeable and replaceable; a supply of tacky material sized to overcover each aperture size is also provided. A kit with multiple task tools may have task tools with aperture sizes of approximately ½ inch×½ inch, 1 inch×1 inch, or 1½ inch×1½ inch.

DETAILED DESCRIPTION

Figure 1C:
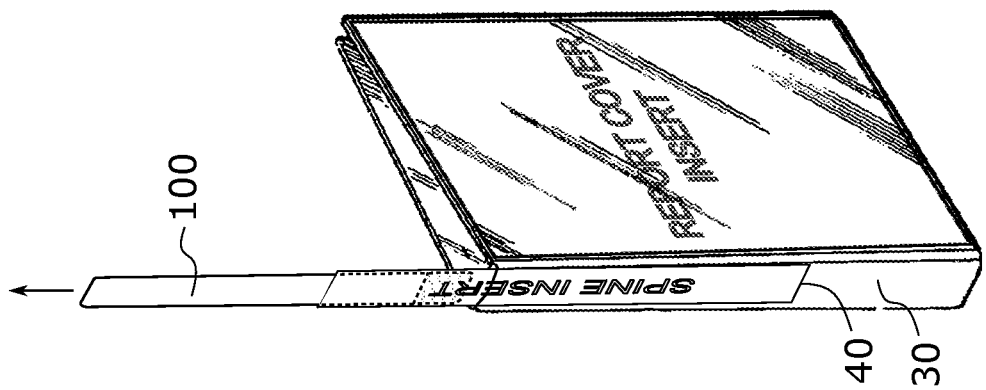
FIGS. 1A-1E illustrate an exemplary embodiment and mode of utilization.
Figure 1B:
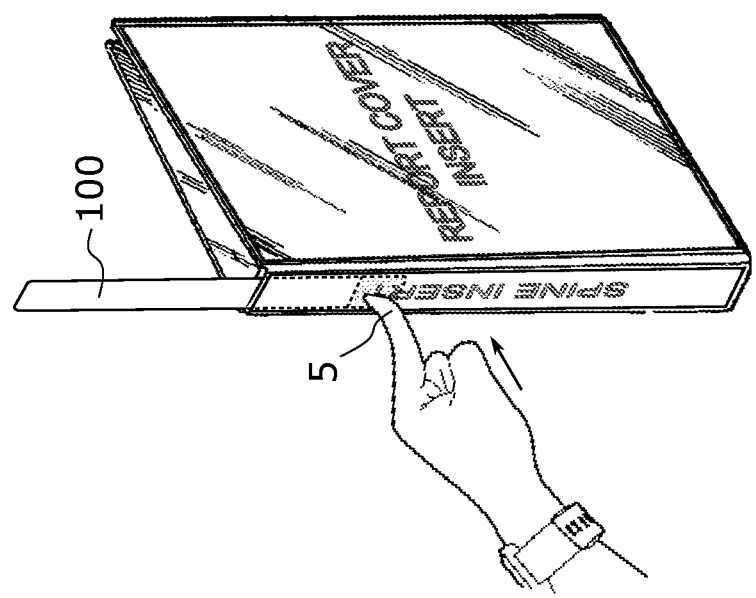
Figure 1A:
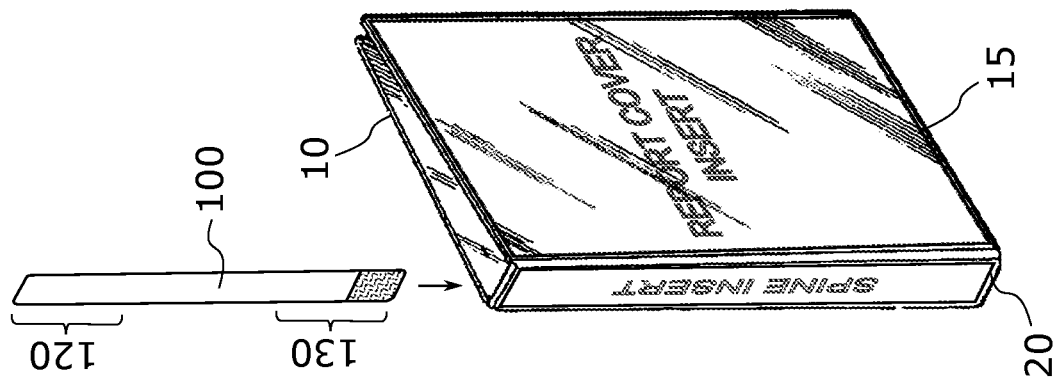
Figure 1D:
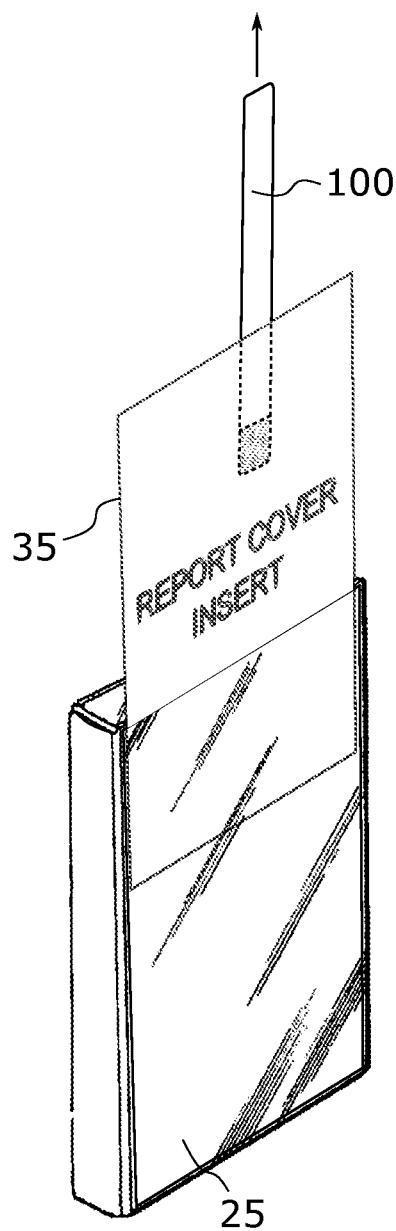

With reference to FIGS. 1A-1D, there is shown a binder 10 having a cover 15 and spine 20, the cover 15 including a clear pocket 25 for holding a cover label medium 35 and the spine 20 including a clear pocket 30 for holding a spine label medium 40. In a first embodiment of the present invention, there is provided a tool 100 for facilitating the removal of an entrapped label medium 35, 40 from a binder pocket 25, 30. The tool comprises a handle end 120 and a capture end 130. Tool 100 is thin, substantially flat, elongate, and narrow so as to be insertable into a binder pocket 25, 30 without damaging or permanently deforming the pocket 25, 30 or binder 10. Once inserted into a pocket 25, 30 (see, e.g., FIGS. 1A-1B), the label medium 35, 40 is tacked to the capture end 130 by manual force applied to the pocket exterior (e.g., pressure from fingertip 5 illustrated in FIG. 1B) so that surfaces of the label medium 35, 40 and capture end 130 are forced together. Then, using handle end 120, the tool 100 is manually withdrawn (e.g., motion illustrated in FIGS. 1C, 1D) from pocket 25, 30 with the label medium 35, 40 tacked to tool 100 and thereby withdrawn from pocket 25, 30 with tool 100.

Tool 100 also has sufficient rigidity and resiliency so as to be insertable without deforming or breaking when high insertion force is needed to overcome (1) friction inherent in insertions into tight pockets or (2) counterforces needed to break tacked surfaces where labels have tacked to the pocket or binder. (Such tacking can occur when ink or toner from the label medium adheres to the pocket or binder.) In one embodiment, the tool may comprise stainless steel, 0.5-0.9 mm in thickness in an exemplary embodiment. In another embodiment, more suited for a disposable or recyclable tool, the tool comprises paperboard; a high-stiffness paperboard such as one of those disclosed in U.S. Pat. No. 4,913,773 (hereby incorporated herein) may be used. Tool 100 may also comprise a suitable plastic; exemplary suitable plastics include polypropylene, ABS, HDPE, LDPE, glycol-modified polyethylene terephthalate (PETG) acrylic plastic, poly (methyl methacrylate) (PMMA), and polycarbonate.

Figure 1E:
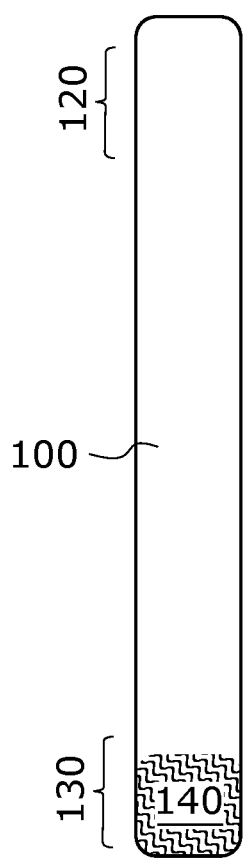

With reference to FIG. 1E, one side of capture end 130 includes a light- to medium-tack pressure sensitive adhesive area 140. Pressure sensitive adhesive area 140 is configured to provide light adhesion to a label medium 35, 40. In an exemplary embodiment, the force required to peel a label medium 35, 40 from the pressure sensitive adhesive area 140 is in the approximate range of 10 to 250 (preferably 30 to 150) gm/cm. Significantly lower peel adhesion may lack the ability to create sufficient tack for removal of the label medium 35, 40 from the pocket 25, 30 due to frictional drag. Significantly higher peel adhesion may cause difficulty with tool insertion and tend to tear or delaminate label media 35, 40 when removing it from pressure sensitive adhesive area 140.

In one embodiment, a portion of one side of capture end 130 is coated with a light- to medium-tack pressure sensitive adhesive to create pressure sensitive adhesive area 140. Exemplary adhesives and techniques for creating pressure sensitive adhesive area 140 are taught in U.S. Pat. No. 5,194,299 (hereby incorporated herein).

In another embodiment, a tack supply is provided with tool 100. An exemplary tack supply (not shown in figures) may include a light- to medium-tack double-coated "repositionable" tape whereby a user would apply a short strip of the double-coated tape to one side of the capture end 130. In a preferred embodiment utilizing double-coated tape, the tape is a differential double-coated tape having a higher-tack side, for example, 120-250 gm/cm, and a lower-tack side, for example 30-120 gm/cm. The higher-tack side would be adhered to the tool 100 capture end 130 so that the lower-tack side faces away from the tool 100. The tack supply may include a removable release substrate (not illustrated), such as glassine, for protecting the tack surface(s) until removal prior to the tack supply being used. Another exemplary light-tack supply (not shown in figures) may include a sprayable repositionable pressure sensitive adhesive such as Scotch® Spray Mount™ Repositionable Adhesive. A user sprays the adhesive on one side of the tool 100 capture end 130, waits for the solvent to evaporate, and then can use tool 100 to remove label media. In another embodiment, the tack supply (not shown in figures) is manually applicable pressure sensitive adhesive such as that found in 3M Scotch® Glue Stick Restickable Adhesive. A user manually applies the adhesive on one side of the tool 100 capture end 130, waits for the solvent to evaporate, and then can use tool 100 to remove label media.

With reference to FIGS. 2A-2G, in an aperture embodiment of the present invention, tool 100 capture end 130 includes an aperture 145. A film or paper carrier 200 carrying a low- to medium-tack pressure sensitive adhesive 140 is tacked over aperture 145 so that a portion of adhesive surface 140 is exposed through the aperture on the other side of tool 100. Suitable pressure sensitive adhesive carrier products include Scotch® Removable Magic™ Tape, Post-it™ Full Adhesive Roll 2650, Post-it™ 658 Labeling & Cover-Up Tape, and 3M™ 9449S repositionable tape. In one aperture embodiment, a tack supply is included with tool 100. For example, a tack supply may include a roll of the single-sided pressure sensitive adhesive film (not illustrated). In another exemplary embodiment, a tack supply may include pressure sensitive adhesive carriers provided in a stack 215 of appropriately sized (slightly larger than aperture 145, but not wider than tool 100) coated films or papers similar to a stack of post-it notes; in this embodiment, pressure sensitive adhesive area 140 covers all but a small section 202 of the film or paper, the small section providing the user the ability to peel one film or paper from tack supply stack 215.

In an exemplary embodiment, tool 100 is 30-35 cm in length, 2-3 cm in width, and 0.5-1.5 mm in thickness.

Figure 2A:
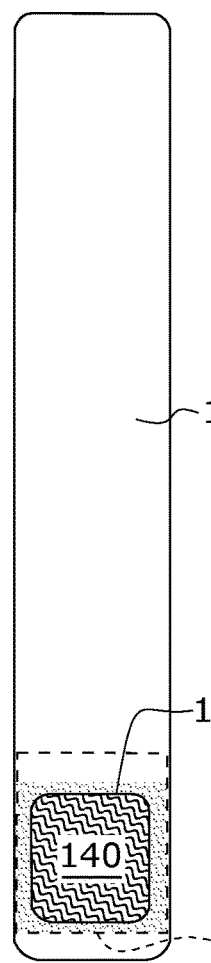
FIGS. 2A and 2B illustrate a front view of an exemplary aperture embodiment of the invention with and without adhesive film.
Figure 2B:
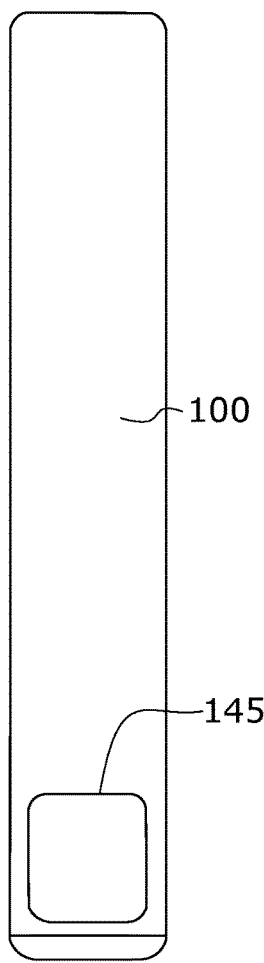
Figure 2C:
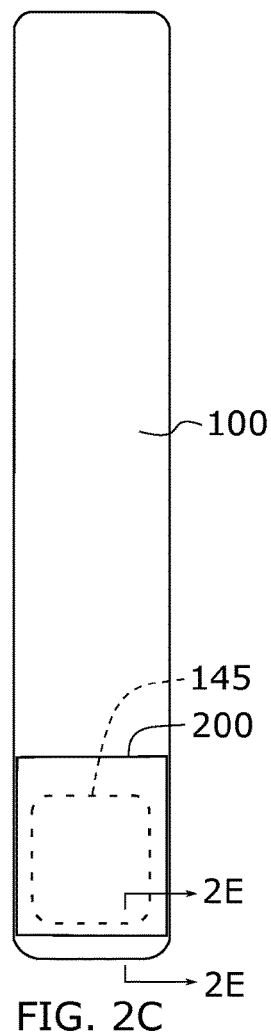
FIG. 2C illustrates a back view of an exemplary aperture embodiment of the invention with adhesive film.
Figure 2D:
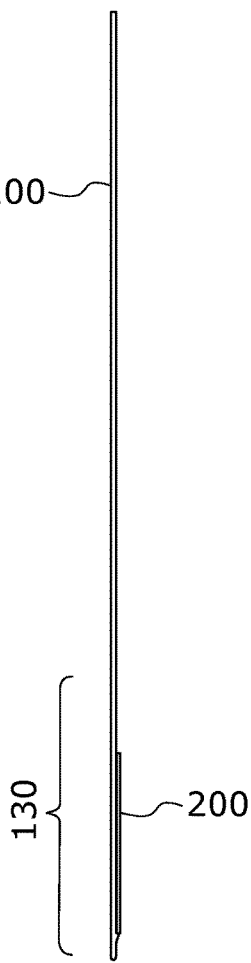
FIGS. 2D and 2E illustrate a side view and cross-sectional detail side view of an exemplary aperture embodiment of the invention with adhesive film.
Figure 2E:
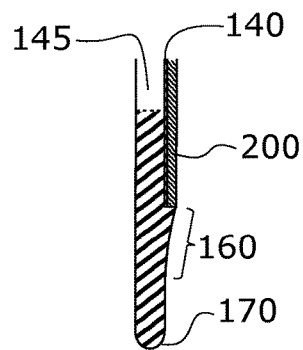
Figure 2F:
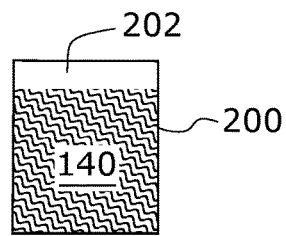
FIGS. 2F, 2G illustrate exemplary adhesive films.
Figure 2G:
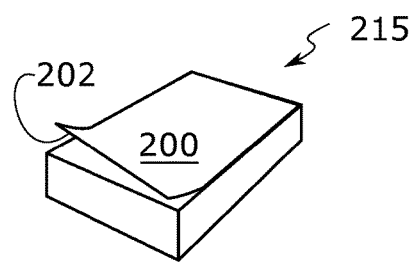

With reference to FIG. 2E, some embodiments may optionally provide an insertion-easing edge profile 170 at capture end 130 so that the insertion of tool 100 into a pocket 25, 30 is eased and tool 100 is less likely to butt the material intended to be removed. Such edge profiles 170 preferably are provided over the full leading insertion edge of tool 100 and may be radiused, chamfered, or beveled. In some embodiments there may optionally be a ramp 160 to lessen the likelihood of the open (e.g., top) edge of pocket 25, 30 from butting off carrier 200 the upon insertion of tool 100.

Figure 3:
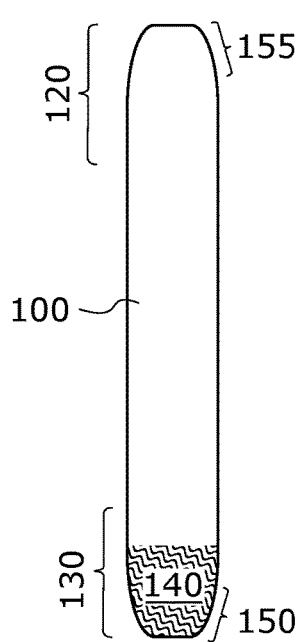
FIG. 3 illustrates an exemplary embodiment of the invention having a taper.

With reference to FIG. 3, alternative embodiments may provide for the tool to have a taper 150 at the capture end 130 and/or a taper 155 at the handle end. A taper eases insertion of tool 100 into a pocket 25, 30. A user may desire to insert handle end 120 of tool 100 into a pocket 25, 30 to break adhesions of label media 35, 40 from binder 10 and/or pocket 25, 30 prior to inserting the capture end 130.

Figure 4A:
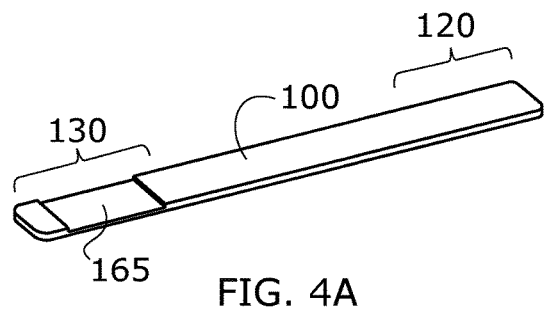
FIGS. 4A and 4B illustrate an exemplary embodiment of the invention having a recess.
Figure 4B:
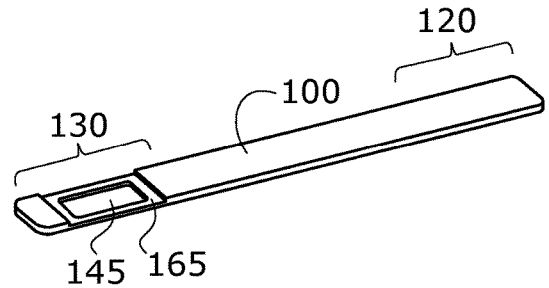

With reference to FIGS. 4A and 4B, alternative embodiments may provide for a recess 165 of pressure sensitive adhesive area 140 so that the leading edge of the label media 35, 40 does not catch the leading edge of the pressure sensitive adhesive area 140, thereby inhibiting insertion. For aperture embodiments of tool 100, recess 165 can be located on the opposite facing side of tool 100 from pressure sensitive adhesive area 140 and can have a depth greater than or equal to the thickness of film or paper carrier 200 and the adhesive it carries.

The invention includes various combinations of aspects of the above described embodiments. For example, tool 100 can optionally have one or all of a wedge, a taper, or an aperture. Embodiments of the invention include kits having one or more tools 100, optionally having distinct sizes (e.g., short tool, long tool, wide tool, and/or narrow tool) supplied with tack supply and optional directions for use.

What is claimed is:

1. A task tool for aiding removal of a cover or spine label from a binder or book pocket, said task tool comprising:
    an elongated substantially rigid flat element having first and second surfaces, an insertion end and a handle end, and a thickness of 0.5 to 1.5 mm and a width of 2 to 3 cm;
    a tacky material disposed on a portion of said first surface of said element proximate to the insertion end, said tacky material having a tackiness of 30-120 gm/cm;
    a handle portion extending from said handle end of said elongated flat element;
    wherein the insertion end comprises an aperture and the tacky material comprises a film or paper carrier having a pressure sensitive adhesive on one surface thereof, said tacky material tacked over the first surface and aperture whereby pressure sensitive adhesive is exposed through the aperture.

2. The task tool of claim 1 where in the insertion end is elliptically tapered in the width dimension.

3. The task tool of claim 1 wherein the insertion end comprises a radiused or chamfered edge profile.

4. The task tool of claim 3 wherein the insertion end comprises an insertion end ramp oriented to lessen butting of the tacky material when said flat element is inserted into a spine label pocket.

5. The task tool of claim 1 wherein the pressure sensitive adhesive covers all of the one surface except for a small section enabling a user to peel the substrate from the tool or from a tack supply.

6. The task tool of claim 1 wherein the element comprises a high stiffness paperboard.

7. The task tool of claim 1 wherein the element comprises substantially rigid and resilient plastic.

8. The task tool of claim 1 wherein the element comprises stainless steel having a thickness of 0.5 to 0.9 mm.

9. A method for removing a binder label insert from a binder pocket, the method comprising:
    inserting the insertion end of the task tool as claimed in claim 1 into a binder pocket so that the tacky material contacts the binder label;
    applying local pressure to the binder pocket where the tacky surface portion underlies; and
    withdrawing the tool with the binder label adhered thereto.

10. A kit for removing binder labels from binder pockets comprising:
    a task tool in accordance with claim 1 wherein the tacky material is removeable and replaceable; and
    a supply of tacky material sized to overcover the aperture of the task tool.

11. A kit for removing binder labels from binder pockets comprising:
    a plurality of task tools in accordance with claim 1 wherein each task tool has a width different than at least one other task tool and each task tool has an aperture size and wherein the tacky material of each task tool is removeable and replaceable; and
    a supply of tacky material sized to overcover each aperture size.

12. The kit of claim 11 wherein the aperture sizes are two or more of approximately ½ inch×½ inch, 1 inch×1 inch, and 1 inch×1½ inch.

\* \* \* \* \*